(12) United States Patent
Inomori et al.

(10) Patent No.: US 7,163,074 B2
(45) Date of Patent: Jan. 16, 2007

(54) MOTORCYCLE AND ENGINE FOR MOTORCYCLE

(75) Inventors: Toshinori Inomori, Iwata (JP);
Kensuke Watanabe, Iwata (JP);
Yasuyuki Nakahira, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 60 days.

(21) Appl. No.: 10/966,762

(22) Filed: Oct. 15, 2004

(65) Prior Publication Data
US 2005/0082101 A1 Apr. 21, 2005

(30) Foreign Application Priority Data
Oct. 15, 2003 (JP) .............................. 2003-355295

(51) Int. Cl.
*B62K 11/00* (2006.01)
*F02B 75/40* (2006.01)

(52) U.S. Cl. ......................................... 180/219; 123/83

(58) Field of Classification Search ................ 180/219; 123/46 R, 465 C, 46 A
See application file for complete search history.

(56) References Cited

U.S. PATENT DOCUMENTS

| 6,758,296 B1* | 7/2004 | Inaoka et al. ................ 180/228 |
| 6,845,836 B1* | 1/2005 | Inaoka et al. ................ 180/228 |
| 6,986,400 B1* | 1/2006 | Osada ......................... 180/228 |
| 2004/0003785 A1* | 1/2004 | Shimizu et al. ........... 123/78 E |

FOREIGN PATENT DOCUMENTS

JP 2003222054 A 8/2003

* cited by examiner

*Primary Examiner*—Tony Winner
(74) *Attorney, Agent, or Firm*—Knobbe, Martens, Olson & Bear, LLP

(57) ABSTRACT

A motorcycle has a cylinder bore that is vertically offset from a crankshaft. A camshaft also is vertically offset from the cylinder bore. The offsets decrease the vertical dimension of the engine. An air induction system approaches a cylinder head from the rear to limit the degree to which the induction system extends forward of the engine. By decreasing the envelope of the engine, more space is provided on the scooter-type motorcycle for a foot rest forward of the engine and a storage compartment above the engine.

25 Claims, 8 Drawing Sheets

[Fig. 1]
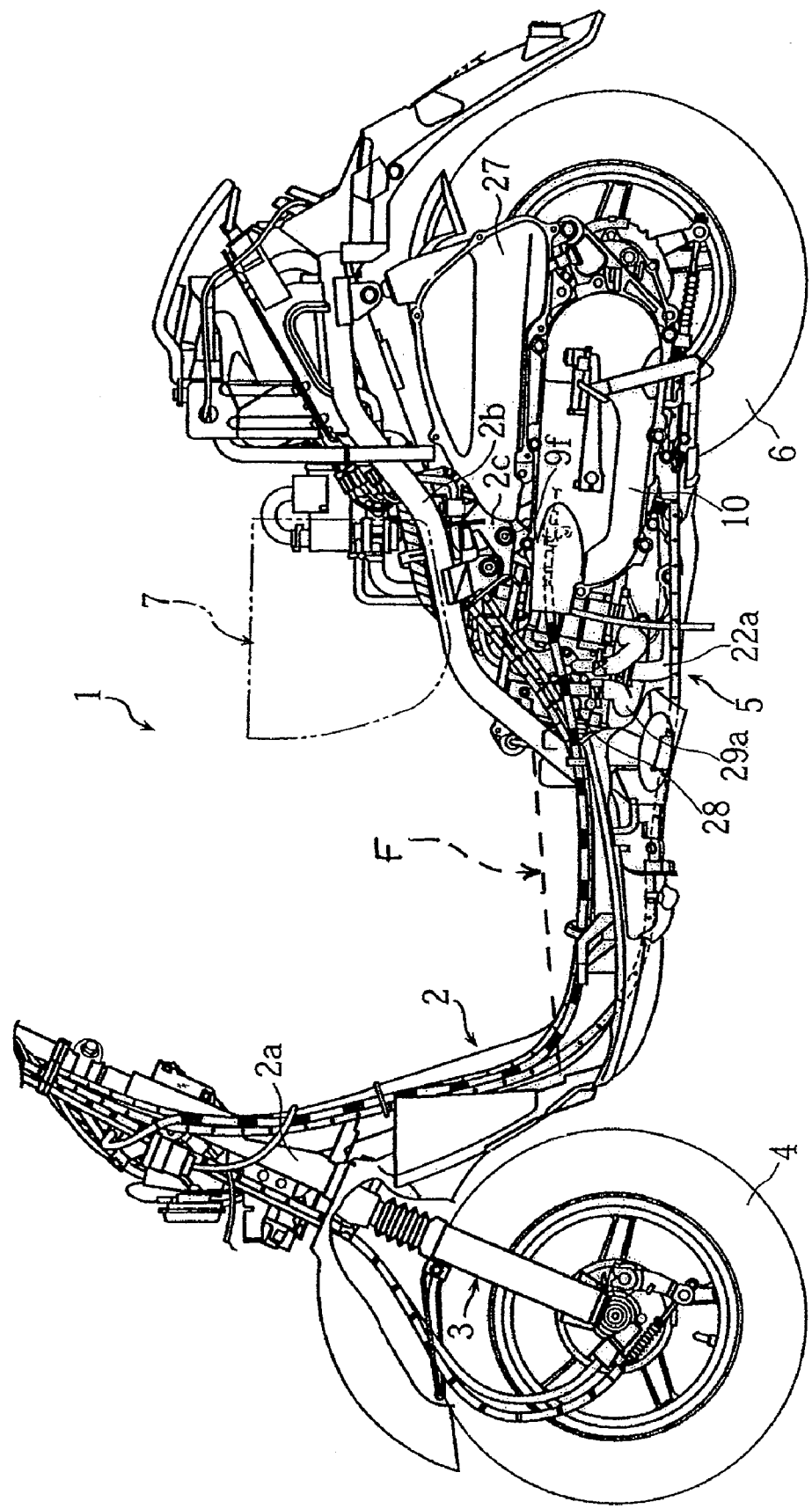

[Fig. 2]
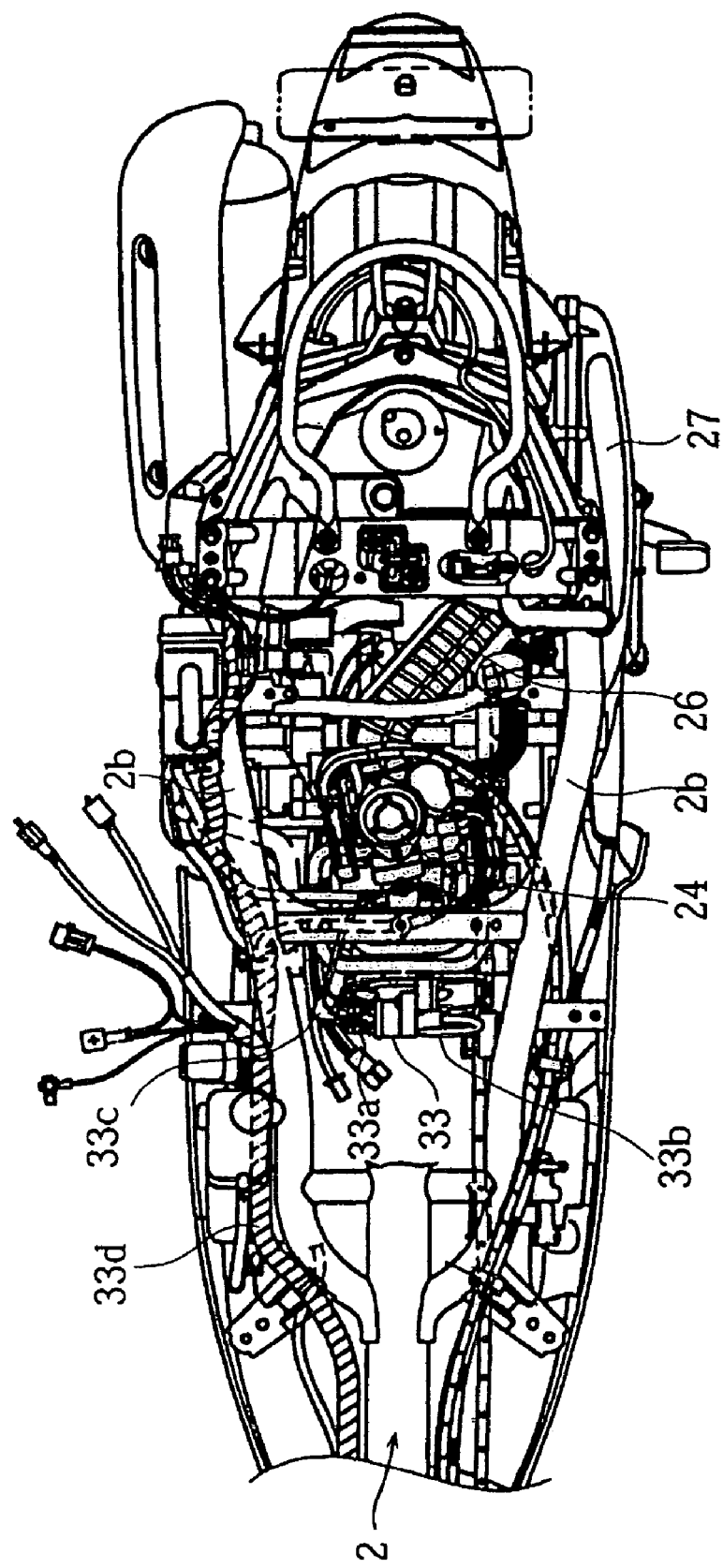

[Fig. 3]
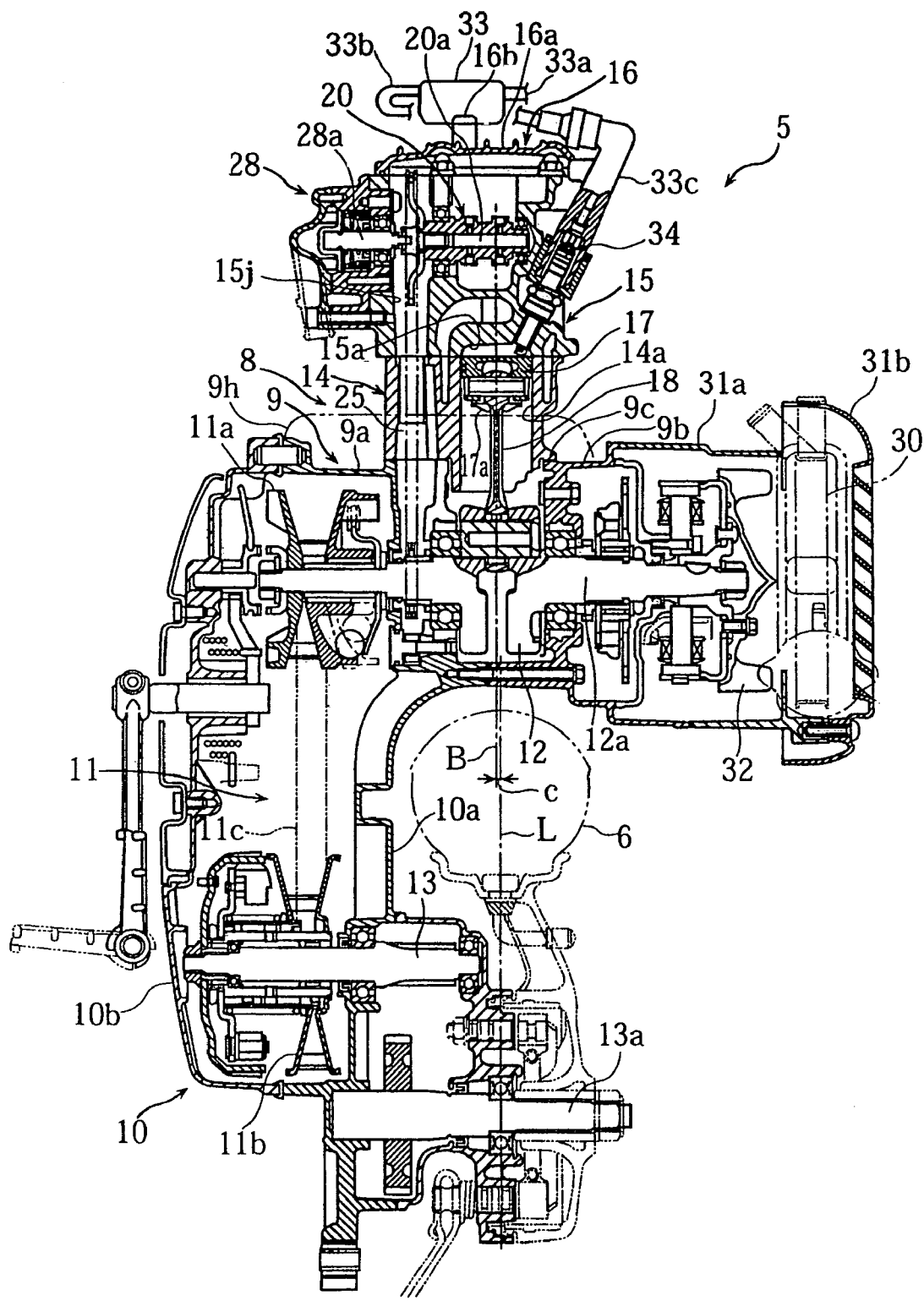

[Fig. 4]
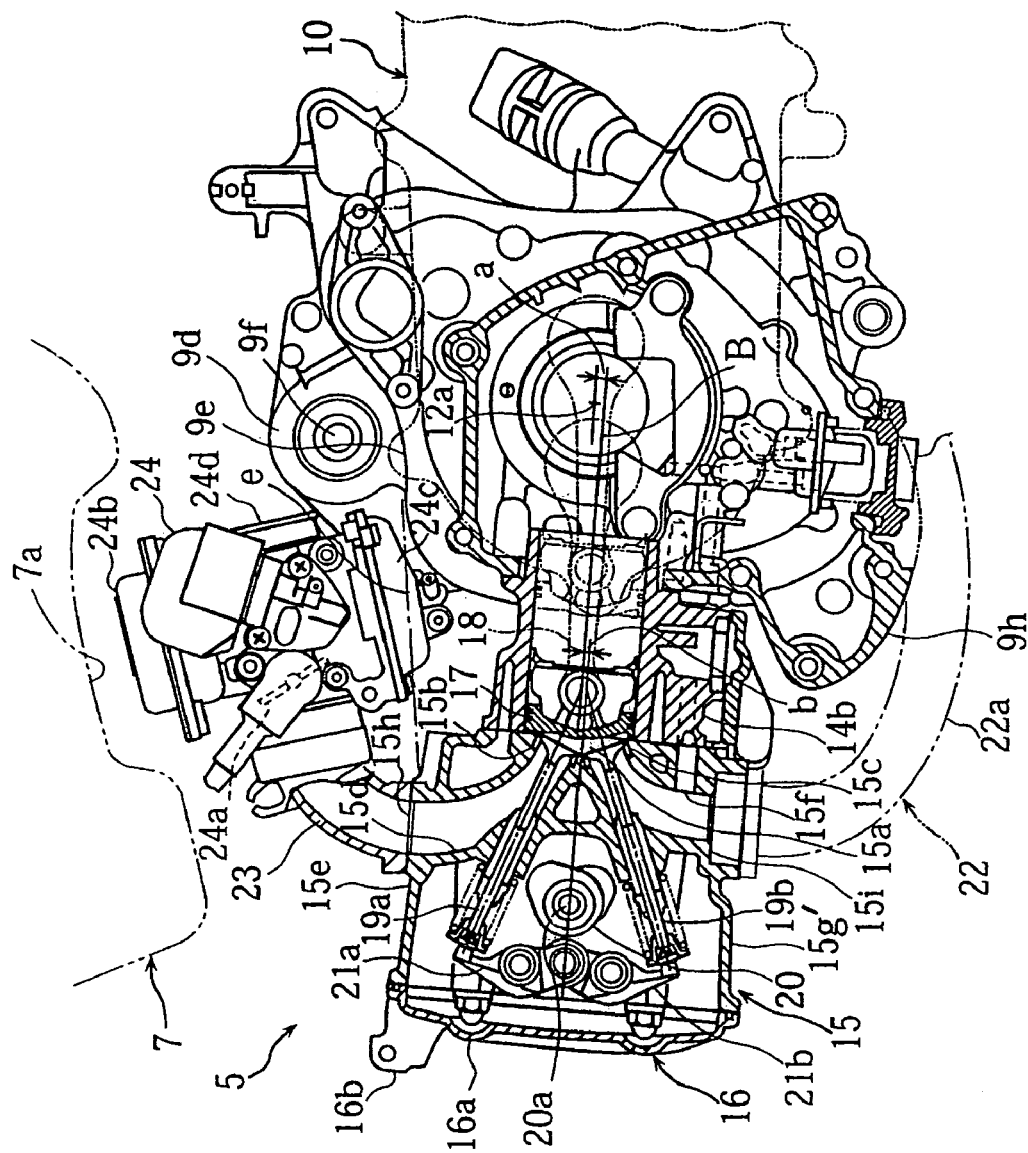

[Fig. 5]
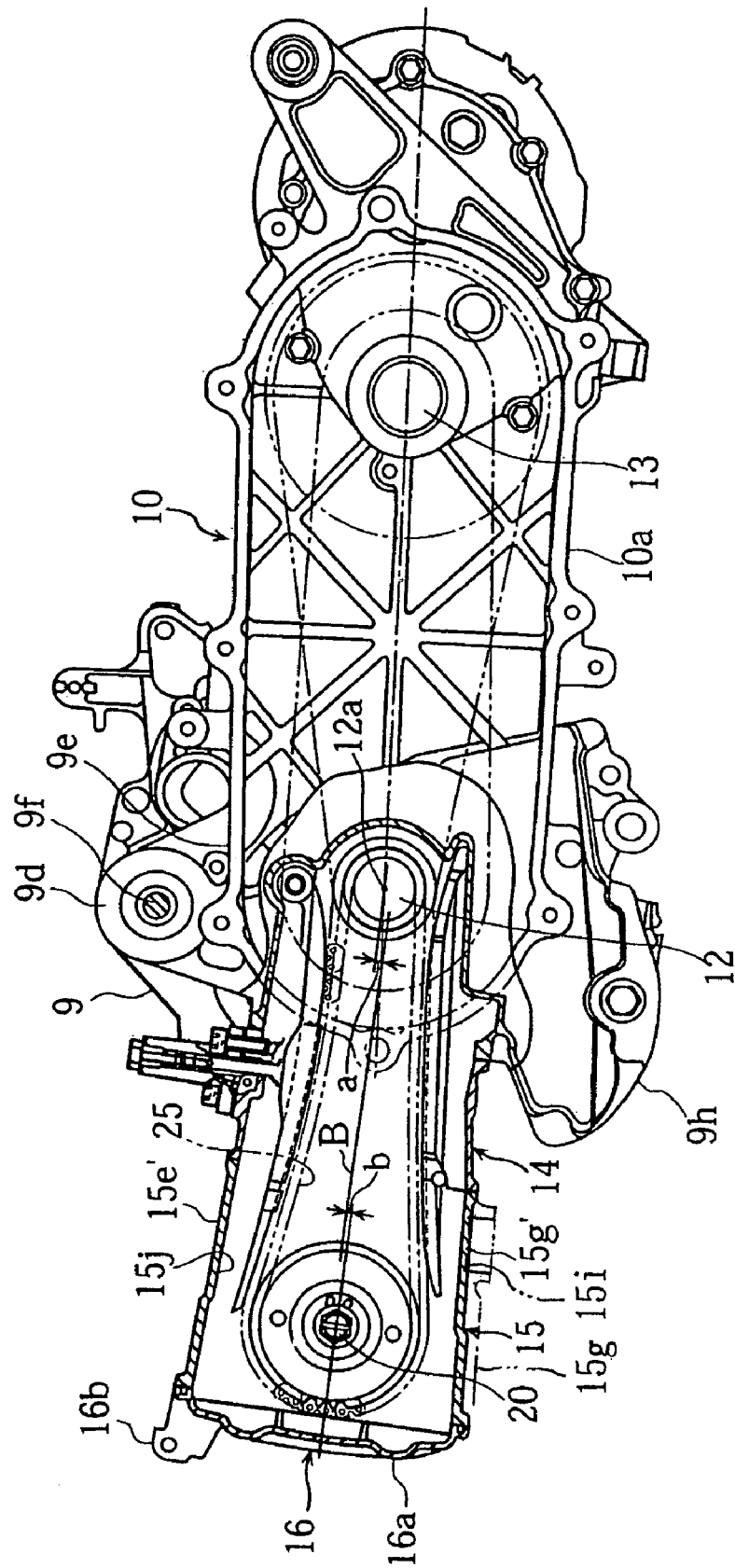

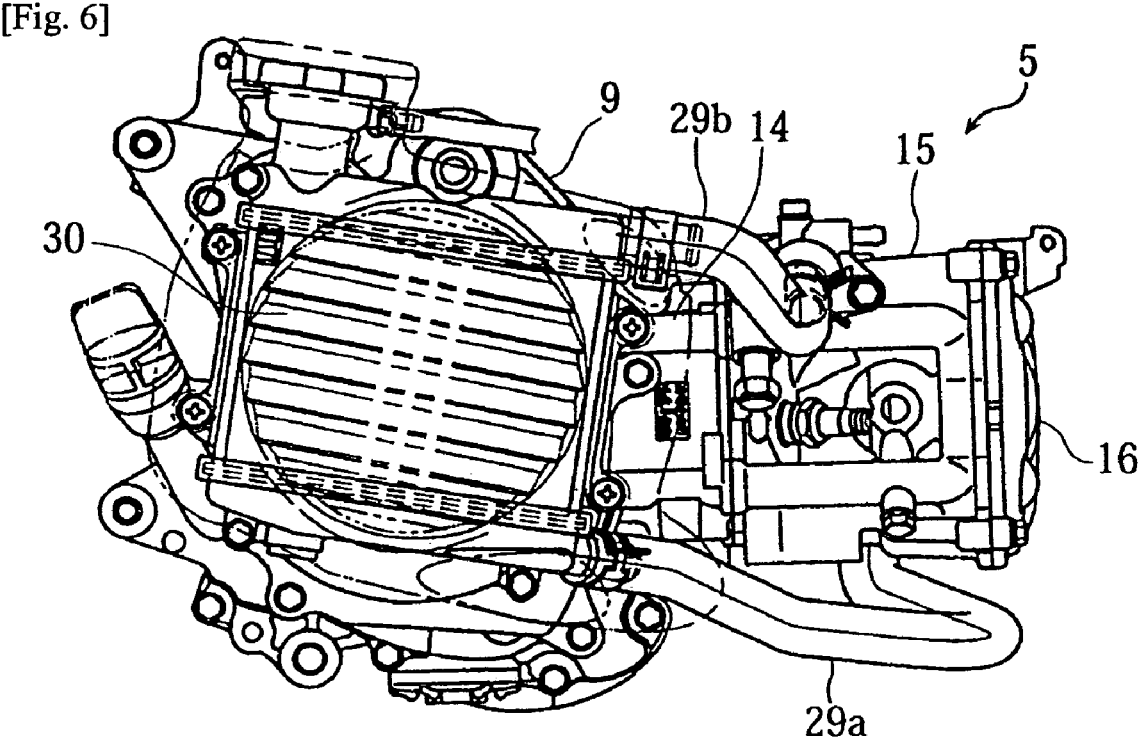
[Fig. 6]

[Fig. 7]
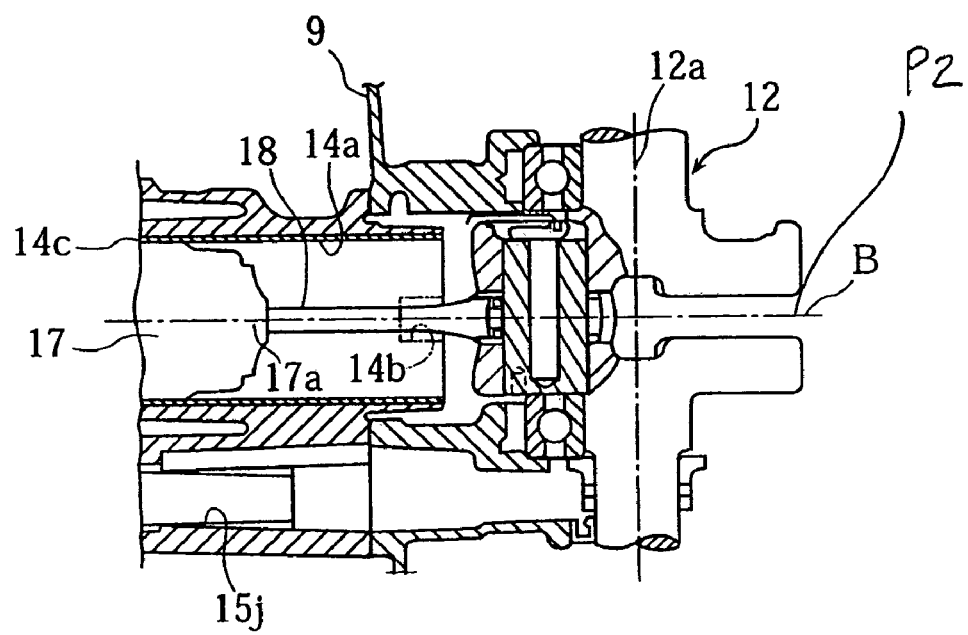

[Fig. 8]
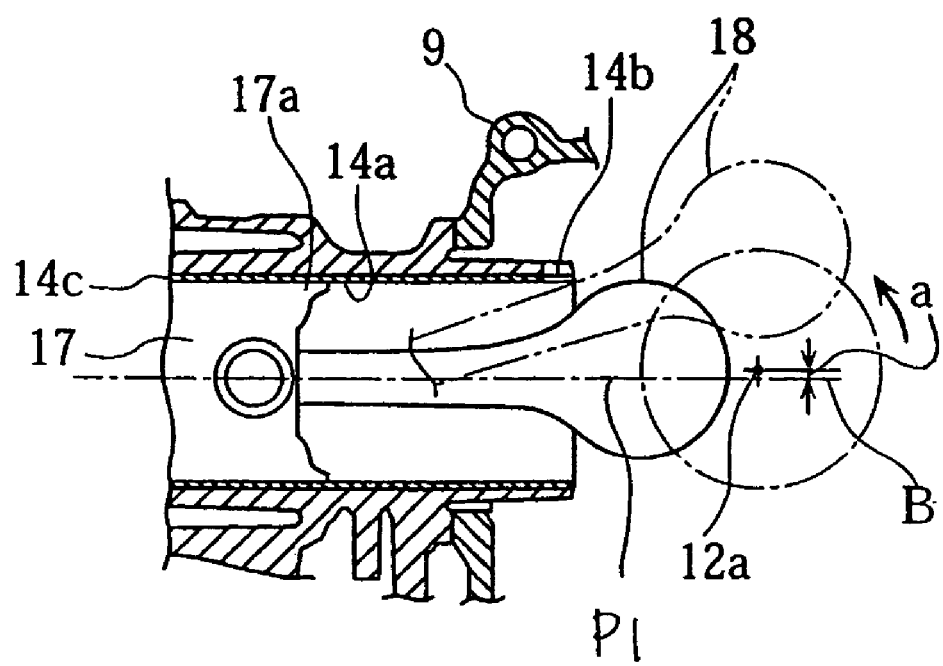

MOTORCYCLE AND ENGINE FOR MOTORCYCLE

PRIORITY INFORMATION

This application is based on and claims priority to Japanese Patent Application No. 2003-355295, filed Oct. 15, 2003, the entire contents of which is hereby expressly incorporated by reference.

BACKGROUND OF THE INVENTION

1. Field of the Invention

The present invention generally relates to a motorcycle and an engine thereof. More particularly, the present invention relates to an engine configuration that reduces the overall size of the engine such that a footrest and/or storage compartment size can be increased.

2. Description of the Related Art

Motor scooters and other forms of motorcycles generally comprise an engine that is positioned vertically below a seat. Moreover, the engine generally is positioned rearward of a footrest. For example, as shown in Japanese Patent Publication No. 2003-222054, published on Aug. 8, 2003 and filed as Japanese Patent Application No. 2002-19643 on Jan. 29, 2002, the engine is positioned rearward of the footrest and below the seat. Due to this placement, the engine features a cylinder axis that is offset relative to an axis of a corresponding crankshaft. The offset orientation allows the cylinder body to be positioned lower than would otherwise be possible if the cylinder axis extended through the crankshaft axis. Thus, the vertical height of the engine can be somewhat reduced.

SUMMARY OF THE INVENTION

Nevertheless, it has been found that the engine of the above-identified publication remains too large in a vertical direction and/or a direction defined by the forward and rearward direction of the motorcycle. In particular, the air induction system extends upward and forward from the engine to accommodate a helmet storage compartment. The placement of the induction system, however, increases the length of the engine and decreases the available room for a foot rest. Moreover, due to the vertical size of the engine in the above-identified publication, the induction system cannot easily be routed in another direction.

Thus, one aspect of the present invention involves recognition of a need for reducing the size of the engine in the fore-and-aft direction and/or in the vertical direction. Thus, a motorcycle can be provided with an engine that is reduced in size in one or both of these directions such that space for arranging a foot rest can be increased and/or space for a storage box with an increased volume can be provided.

Another aspect of the present invention involves a motorcycle comprising a footrest and an engine. The footrest is positioned forward of the engine. The engine comprises a cylinder body, a cylinder head and a crankcase. The cylinder body is positioned between the cylinder head and the crankcase. The cylinder head is closer to the footrest than the crankcase. An induction system communicates with the cylinder head on an upper surface of the cylinder head. The induction system comprises an intake passage with an upstream direction that extends rearward from the cylinder head. The cylinder body comprises a central axis. A crankshaft is positioned within the crankcase. The crankshaft extends generally transversely and comprises a rotational axis. A rearwardly extending imaginary extension along the central axis of the cylinder body extends below the rotational axis of the crankshaft such that the cylinder body is offset relative to the crankshaft.

An additional aspect of the present invention involves a motorcycle comprising an engine. The engine comprises a cylinder body and a cylinder head. The cylinder body comprises a cylinder bore. The cylinder bore comprises a central axis. A crankcase is connected to the cylinder body. The crankcase contains a crankshaft. The crankshaft comprises a rotational axis. The cylinder body is connected to the cylinder head. The cylinder body is positioned between the cylinder head and the cylinder body. The cylinder head is positioned generally forward of the cylinder body. The cylinder body is positioned generally forward of the crankcase. The engine also comprises a valve train. The valve train comprises a single camshaft. The camshaft comprises a transverse rotational axis. The camshaft is operably connected to an intake valve and an exhaust valve such that rotation of the camshaft about the transverse rotational axis results in opening and closing of the intake valve and the exhaust valve. The cylinder body is offset relative to the crankshaft such that the rotational axis of the crankshaft and the central axis of the cylinder bore do not intersect and the cylinder body is offset relative to the camshaft such that the transverse rotational axis of the camshaft and the central axis of the cylinder bore do not intersect.

A further aspect of the present invention involves a motorcycle comprising an engine. The engine comprises a cylinder body and a cylinder head. The cylinder head defines a cam chamber. A cam shaft is positioned within the cam chamber. The camshaft comprises a cam axis. A drive member is secured to the cam shaft. The cylinder body is connected to the cylinder head with the cylinder head being positioned generally forward of the cylinder body. A crankcase is connected to the cylinder body. The cylinder body is positioned generally forward of the crankcase. The crankcase contains a crankshaft. The crankshaft is adapted to rotated about a rotational axis. The cylinder body defines a cylinder bore. The cylinder bore comprises a central axis. An exhaust pipe is connected to a generally downwardly facing surface of the cylinder head. The cylinder body is offset relative to the crankshaft such that a rearwardly extending imaginary extension of the central axis extends below the rotational axis of the crankshaft. An interface between the cylinder head and the exhaust pipe is generally vertically aligned with a lower wall of the cylinder head proximate the drive member.

BRIEF DESCRIPTION OF THE DRAWINGS

These and other features, aspects and advantages of the present invention will now be described with reference to the drawings of a more than one preferred embodiment, which embodiments are intended to illustrate and not to limit the invention. The drawings comprise eight figures.

FIG. 1 is a left side view of a motorcycle that is arranged and configured in accordance with certain features, aspects and advantages of the present invention.

FIG. 2 is a plan view of a rear portion of the motorcycle of FIG. 1.

FIG. 3 is a sectioned plan view taken through an engine unit of the motorcycle of FIG. 1.

FIG. 4 is a sectioned left side view of a portion of an engine of the engine unit shown in FIG. 3. This view shows a cam shaft, a pair of valves, a combustion chamber, a piston and the connecting rod.

FIG. 5 is sectioned left side view of another portion of the engine of the engine unit shown in FIG. 3. This view shows a cam shaft drive system.

FIG. 6 is a right side view of the engine of the engine unit shown in FIG. 3.

FIG. 7 is a sectioned plan view of a portion of a cylinder body, piston and connecting rod of an engine that is arranged and configured in accordance with certain features, aspects and advantages of the present invention.

FIG. 8 is a sectioned left side view of the cylinder body, piston and connecting rod shown in FIG. 7.

DETAILED DESCRIPTION OF THE PREFERRED EMBODIMENT

With reference to FIGS. 1 to 6, a motorcycle 1 and engine unit 5 are illustrated that have been arranged and configured in accordance with certain features, aspects and advantages of the present invention. FIG. 1 and FIG. 2 are a left side view and a plan view of a scooter type motorcycle. FIG. 3 is a sectional plan exploded view of an engine unit. FIG. 4 is a sectional left side view of a main portion of an engine of the engine unit. FIG. 5 is a sectional left side view of the engine unit. FIG. 6 is a right side view of a main portion of the engine. As used in the description, "front", "rear", "left", and "right" mean "front", "rear", "left", and "right" as viewed by a person sitting on a seat of the scooter type motorcycle in an operating position.

In the drawings, a reference numeral 1 denotes a scooter type motorcycle. The illustrated motorcycle 1 comprises a front wheel 4 that is rotatably supported by a front fork 3. The front fork is supported in such a manner as to be steered to the left and right by a head pipe 2a provided on the front end of a vehicle frame 2. A swing type engine unit 5 is arranged under a rear frame 2b. The engine unit 5 is supported for movement in an up and down direction relative to the rear frame 2b. A rear wheel 6 is rotatably supported by the rear end portion of the engine unit 5 and a storage box 7 is arranged above the engine unit 5. An opening at the top end of the storage box 7 is opened or closed by a seat (not shown). Preferably, the frame 2 and the storage box 7 are surrounded by a covering member.

In one arrangement, the engine unit 5 comprises a water-cooled 4-cycle single cylinder type engine body 8. Other types of engines also can be used. The engine body comprises a crankcase 9 that is divided into a right case 9a and a left case 9b. The engine unit 5 also comprises a transmission case 10 that extends rearward from the engine body 8. Preferably, the engine body 8 and the transmission case 10 are secured together to form the integrated engine unit 5.

The transmission case 10 comprises a case body 10a that extends rearward from the left case 9a of the crankcase. The case body 10a can be integrally formed with a portion of the crankcase. A case cover 10b can be removably mounted on the outside of the case body 10a.

A belt type continuously variable transmission (CVT) 11 is arranged in this transmission case 10. The CVT 11 generally comprises a driving pulley 11a that is mounted to the crankshaft 12. In the illustrated arrangement, the CVT 11 is mounted to the left end of the crankshaft. The CVT 11 also comprises a driven pulley 11b that is mounted to an intermediate shaft 13. In the illustrated arrangement, the driven pulley 11b is closer to the rear wheel than the drive pulley 11a. A V belt 11c or any other suitable flexible endless transmitter can be looped over the driving pulley 11a and the driven pulley 11b. As illustrated, the intermediate shaft 13 preferably is coupled via a gear mechanism to a rear wheel shaft 13a and the rear wheel 6 is fixed to the rear wheel shaft 13a.

The engine body 8 generally comprises a cylinder body 14, a cylinder head 15 and a head cover 16. The cylinder head 15 preferably is interposed between the cylinder body 14 and the head cover 16. Moreover, in the illustrated arrangement, the head cover 16 is positioned forward of the cylinder head 15 and the cylinder head 15 is positioned forward of the cylinder body 14. The cylinder body 14 preferably is connected to the front wall 9c of the crankcase 9. A piston 17 can be inserted into a cylinder bore 14a defined within the cylinder body 14 and the piston 17 can be coupled to the crankshaft 12 by a connecting rod 18.

With reference to FIG. 4, the engine body 8 preferably comprises at least one, and more preferably two, intake valve openings 15b. The engine body 8 also preferably comprises at least one exhaust valve opening 15c. The intake valve openings 15b and the exhaust valve opening 15c preferably are formed in a depression 15a that is formed at the cylinder body 14 side mating face of the cylinder head 15. The depression 15a at least partially defines a combustion chamber.

The illustrated intake valve openings 15b communicate with the upper wall 15e of the cylinder head 15 through an intake port 15d. The intake port 15d defines at least a portion of an intake passage. An outside mounting face 15h of the intake port 15d preferably is generally perpendicular or normal to a face of the cylinder head that abuts the cylinder body 14. In one arrangement, the outside mounting face 15h is substantially flush with the upper wall 15e of the cylinder head. Furthermore, the upper wall 15e of the cylinder head preferably is slightly higher in the region above a chain chamber portion 15e' of the wall 15e corresponding to a chain chamber 15j through which a cam chain, cam belt or the like 25 extends than the portion of the wall that is closer to the cylinder body 14. Preferably, a drive member, such as a sprocket, gear, pulley or the like is used on both the camshaft and the crankshaft to connect the camshaft and crankshaft with the cam timing chain or belt, for instance. The illustrated chain chamber and cam chamber forms a generally compact engine structure while providing ample volume within the cylinder head 15 to accommodate the cam chain 25 and other related components.

With continued reference to FIG. 4, the exhaust valve opening 15c communicates with a lower wall 15g through an exhaust port 15f that defines at least a portion of an exhaust passage. The outside mounting face 15i of the exhaust port 15f preferably is recessed into the lower wall 15g. Notwithstanding the preferred recessed arrangement of the outside mounting face 15i, the outside mounting face 15i preferably extends downward nearly to the same degree as the portion 15g' of the lower wall 15g that corresponds to the chain chamber 15j.

The intake valve 19a and the exhaust valve 19b are arranged at the intake valve opening 15b and the exhaust valve opening 15c, respectively, and the intake valve 19a and the exhaust valve 19b are opened or closed via intake and exhaust rocker arms 21a and 21b by one camshaft 20.

With reference still to FIG. 4, when viewed from the side of the vehicle, the cylinder body 14, the cylinder head 15 and the head cover 16 are arranged such that they are leaning toward the front of the motorcycle 1 with an axis B of the cylinder bore 14a being slightly higher at the front side with respect to a horizontal line. More preferably, these components are arranged at an offset position in such a way that the axis B of the cylinder bore 14a is positioned below the axis 12a of the crankshaft 12 by a distance of "a". Even more preferably, the camshaft 20 can be offset in such a way that its axis 20a is positioned below the axis B of the cylinder bore 14a by a distance of "b" (see FIG. 4 and FIG. 5). The offset positions of the components advantageously lower the respective components and create more open space above the engine.

With reference to FIG. 3, when the engine unit 5 is viewed in plan view, the engine body 8 preferably is positioned relative to a longitudinal center plane L of the vehicle such that the axis b of the cylinder bore is offset to the left with respect to the center plane L by a distance of c. As illustrated, the pump shaft 28a of a coolant pump 28 preferably is coupled to the camshaft 20. In one arrangement, the pump shaft 28a is coupled to the left end of the camshaft 20. In another arrangement, the pump shaft 28a is integrally formed with the camshaft 20. As illustrated in FIG. 1, coolant discharged from the coolant pump 28 can be routed through a return hose 29a arranged so as to pass below the cylinder head 15 to a radiator 30 (see FIG. 6) arranged on the right side of the vehicle. A supply house 29b routes the coolant from the radiator 30 to a cooling jacket that is used to cool the engine body 8.

With reference to FIG. 3, the radiator 30 advantageously is positioned within, or adjacent to, a wind introducing cover 31b. The cover 31b in the illustrated arrangement is positioned on the right side of the crankcase 9. Preferably, the cover 31b is removably mounted on a fan casing 31a. More preferably, the cover 31b is positioned in such a way as to cover the right end portion of the right case 9b of the crankcase 9. A fan 32 can be mounted on the crankshaft 12 or any suitable shaft. Advantageously, the fan 32 is positioned within the casing 31a.

With continued reference to FIG. 3, an ignition coil 33 preferably is arranged along a front wall 16a of the head cover 16. More preferably, the ignition coil 33 is positioned outside of the head cover 16 but adjacent thereto. The ignition coil 33 can be retained by a support boss portion 16b formed in the head cover 16.

In the illustrated arrangement, the ignition coil 33 is arranged with its axis pointed in a transverse direction of the vehicle such that a primary coil 33a faces to the right side of the vehicle and a secondary coil 33b faces to the left side. The primary coil 33a merges with a main harness arranged in such a way as to extend along the right side of the vehicle and the secondary coil 33b extends from the left side of the ignition coil 33 to the right side of the vehicle. The secondary coil 33b is connected to a plug cap 33c. The plug cap 33c is mounted on the ignition plug 34. In the illustrated arrangement, the ignition plug is arranged on the right side of the cylinder head 15. Other positions also are possible.

Because the ignition coil 33 is fixed to the head cover 16, a distance between the ignition plug 34 and the secondary coil 33b is minimized. In addition, the secondary coil 33b is constructed to extend from the left side of the ignition coil 33 to the right side so that the secondary coil 33b can be shortened while facilitating easy mounting and removal of the plug cap with the ignition plug 34. In other words, by routing the secondary coil 33b in the manner described, sufficient length is provided to allow the cap to be easily placed on and removed from the ignition plug 34.

The exhaust pipe 22a of an exhaust device 22 is connected to the outside mounting opening 15i of the exhaust port 15f. The outside mounting opening 15i is recessed from the lower wall 15g of the cylinder head 15 as described above, so that while the camshaft 20 can be arranged at a lower offset position, sufficient road clearance is provided to the exhaust pipe 22a while the exhaust pipe 22a can be maintained at a sufficiently large diameter.

An intake manifold 23 defines a portion of an intake passage. The manifold 23 is connected to the outside mounting face 15h of the intake port 15d, which defines a portion of the intake passage. The intake manifold 23 and the intake port 15d advantageously are formed in a smoothly continuous arc. In the illustrated arrangement, the intake manifold 23 and the intake port 15d generally define a semicircle and a carburetor body (i.e., a member for varying a passage area) 24 is connected to the upstream end of the intake manifold 23. The carburetor body 24 preferably comprises a throttle valve 24a that is provided on the downstream side of a venturi portion of the intake passage. The carburetor body 24 also preferably comprises a diaphragm chamber 24b and a float chamber 24c, which can be provided on the upper side and on the lower side of the venturi portion, respectively. In some arrangements, a recess 7a can be formed in a lower portion of the storage box 7 to reduce the likelihood of contact between the carburetor body 24 and the storage box 7. If the engine comprises a fuel injection valve, a throttle body comprising a throttle valve can be provided as the member for varying a passage area.

The carburetor body 24 inclines to the right side of the illustrated vehicle when viewed in plan view and an intake duct 26 preferably is connected to the intake port 24d of the carburetor body 24. In the illustrated arrangement, the intake duct 26 bends to the left side of the vehicle and its upstream end portion is connected to an air cleaner 27. The air cleaner can be positioned in any suitable position and, in one arrangement, can be arranged on top of the transmission case 10.

The engine can be mounted in any suitable manner. In the illustrated arrangement, an engine suspension boss portion (engine suspension portion) 9d can be integrally formed with the upper wall 9e of the crankcase 9 on the rear side of the carburetor body 24. The suspension boss portion 9d can be supported to pivot up and down direction about a support shaft 9f (see FIG. 1). In the illustrated arrangement, a support bracket 2c is fixed to the rear frame 2b and the support bracket 2c journals the shaft 9f. Other arrangements also can be used to secure the engine unit to the rear frame 2b.

With reference to FIG. 4, the upper wall 15e of the cylinder head 15 and the upper wall 9e of the crankcase 9 extend further upward than the upper wall of the cylinder body 14 such that a depression is defined between the crankcase 9 and the cylinder head 15. As illustrated, the carburetor body 24 is positioned forward of the suspension boss portion 9d and the lower portion of the float chamber 24c is disposed lower than a line "e" that connects the upper walls 15e and 9e. Thus, at least a portion of the carburetor body 24 is positioned within a recess defined between the cylinder head 15 and the crankcase 9. In this manner, the carburetor body 24 is arranged in such a way as to be positioned generally adjacent to the cylinder body 14. While the radius of curvature of the intake passage, which is at least partially defined by the intake port 15d and intake manifold 23, can be set at a size capable of reducing flow resistance, the carburetor body 24 can be positioned close to the cylinder body 14, whereby the engine can be reduced in height in the generally vertical direction. As a result, the volume of the storage box can be increased into the region that would otherwise be occupied by one or more of these components. Moreover, because the intake manifold 23 extends generally rearward, the intake manifold, the carburetor body and other intake components advantageously are positioned in regions other than the region of the foot rest F (schematically shown) such that an increased foot rest size can be provided.

With reference still to FIG. 4, an oil pan 9*h* advantageously is formed in the bottom wall of the crankcase 9. The front end portion of the oil pan 9*h* preferably is located forward of the midpoint in the axial direction of the cylinder body 14. In one presently preferred arrangement, the forward end of the oil pan 9*h* is positioned near the rear end of a skirt portion 17*a* of the piston 17 when the piston is located in top dead center.

As illustrated, the cylinder body 14 desirably is offset such that its cylinder axis B extends below the axis 12*a* of the crankshaft 12. In addition, at least the intake manifold 23 extends generally rearward from the upper wall 15*e* of the cylinder head 15. Moreover, the carburetor body 24 is connected to the intake manifold 23. Hence, the arrangement of the cylinder body 14 at the lower offset position can further reduce the total height of the engine and can accordingly increase the volume of the storage box 7.

With reference still to FIG. 4, a valve train is provided that drives the intake and exhaust valves. The valve train advantageously has a structure in which one camshaft 20 can be generally centrally arranged within the cylinder head 15 in the vertical direction. By using a single camshaft 20 to operate the intake valves and the exhaust valves, unlike the case where two camshafts are used, the upper wall portion of the cylinder head does not need to be expanded upward to provide adequate operating room for the camshaft and any related valve train components. Thus, the single cam shaft construction further reduces the overall height of the engine.

With reference to FIG. 5, the camshaft 20 preferably is offset lower than the cylinder axis B. By offsetting the camshaft 20, the intake valve 19*a* located on the upper wall 15*e* side of the cylinder head 15 can extend more along the direction of the cylinder axis B. In other words, the intake valve 19*a* can extend at a smaller angle relative to the exhaust valve. The reorientation of the intake valve 19*a* also acts to reduce the height of the upper wall 15*e* of the cylinder head 15 and, hence, helps to reduce the overall height of the engine.

Still further, the cylinder head side connection face 15*h* of the intake manifold (intake passage) 23 is perpendicular to the cylinder body side mating face of the cylinder head 15 and is located at a position higher than a portion 15*e'* corresponding to the cam chain arrangement chamber (drive member arrangement chamber) 15*j* of the upper wall 15*e*. Hence, the connection face 15*h* can be easily machined.

With reference again to FIG. 4, the mounting face 15*i* of the exhaust pipe 22*a* is located at a position along the lower wall 15*g* of the cylinder head 15, which position is nearly as high as the portion 15*e'*, which corresponds to the cam chain arrangement chamber 15*j*. Thus, the cylinder body 14 and the cylinder head 15 extend further downward than the mounting face 15*i* of the exhaust pipe 22*a* and the exhaust pipe 22*a* benefits from increased road clearance such that the exhaust pipe 22*a* does not have to be greatly downsized to fit within the region defined between the engine and a suitable level of road clearance.

With reference now to FIGS. 7 and 8, another embodiment is shown that is arranged and configured in accordance with certain features, aspects and advantages of the present invention. The same reference symbols as those in FIGS. 1 to 6 denote the same or corresponding parts.

In the arrangement described above, the cylinder bore 14*a* preferably is formed by the cylinder body 14 without the insertion of a cylinder liner. In the arrangement shown in FIGS. 7 and 8, for example, a cylinder liner 14*c* can be inserted into the cylinder body 14. The cylinder liner 14*c* can be formed of any suitable material and can be inserted in any suitable manner. In one arrangement, the cylinder liner 14*c* is formed of cast iron and is pressed into the cylinder body 14. In such configurations, the inner peripheral surface of the cylinder liner 14*c* forms the cylinder bore 14*a*.

With reference to FIG. 7, a recessed portion 14*b* preferably is defined within the liner 14*c*. The recessed portion 14*b* aids in reducing the likelihood of the connecting rod 18 contacting the cylinder bore 14*a*. In one particularly preferred arrangement, the recessed portion 14*b* is formed in the shape of the connecting rod. Desirably, the recessed portion 14*b* is positioned only on the end of the cylinder liner 14*c* closest to the crankshaft. More desirably, the recessed portion 14*b* is positioned on the portion of the cylinder liner 14*c* that on the same side as the crankshaft axis of a plane P1 that (1) extends along the cylinder axis B and (2) is parallel to the crankshaft axis. Even more preferably, the recessed portion 14*b* is intersected by a second plane P2 that extends generally normal to the first plane P1 and that intersects the cylinder axis B.

This recessed portion 14*b* preferably is sized and configured to reduce the likelihood of interference between the connecting rod 18 and the cylinder bore 14*a* while the length of the connecting rod 18 can be minimized even though the cylinder axis B is offset generally vertically downward. The recessed portion 14*b* advantageously can be formed in such a way as to have a width larger than a radial thickness of the connecting rod 18 and smaller than the width of the skirt portion 17*a* of the piston 17. More preferably, the distance from the top of the piston at top dead center to the bottom of the skirt portion 17*a* of the piston 17 in bottom dead center is less than the distance from the top of the piston in top dead center to the forwardmost end of the recessed portion 14*b*.

With provision of the recessed portion 14*b*, movement of the connecting rod 18 can be accommodated by the sidewall of the cylinder bore and the length of the connection rode does not need to be elongated to avoid contact with the cylinder bore. Thus, the crankshaft can be located fairly closely to the cylinder body even though the cylinder body is offset from the axis of rotation of the crankshaft. Such an arrangement provides a compact engine in the fore and aft direction even with the vertical offset. Further, because the recessed portion 14*b* is formed only in a portion of the cylinder wall (e.g., the upper portion in FIG. 8), the cylinder liner 14*c* does not need to have an unnecessary material removed therefrom. That is, depending on the amount of offset of the cylinder body 14, a portion (lower portion in FIG. 8) opposite to the crankshaft axis 12*a* of the cylinder bore 14*a* generally would not interfere with movement of the connecting rod 18 and this portion would not require a recessed portion. While such a recessed portion 14*b* could be formed on both sides or completely around the sleeve, not forming such recessed portions decreases the amount of labor involved in manufacturing the engine. Moreover, the recessed portion 14*b* also can be formed in the engine shown in FIGS. 1–6, if desired.

Although the present invention has been described in terms of a certain preferred embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising an engine, said engine comprising a cylinder body, a cylinder head and a crankcase, said cylinder body being positioned between said cylinder head and said crankcase, said cylinder head being positioned generally forward of said crankcase, an induction system communicating with said cylinder head on an upper surface of said cylinder head, said induction system comprising an intake passage with an upstream direction that extends rearward from said cylinder head, said cylinder body comprising a central axis, a crankshaft being positioned within said crankcase, said crankshaft extending generally transversely and comprising a rotational axis, a rearwardly extending imaginary extension along said central axis of said cylinder body extending below said rotational axis of said crankshaft such that said cylinder body is offset relative to said crankshaft.

2. The motorcycle of claim 1, wherein said engine is supported pivotally supported relative to a rear frame of said motorcycle.

3. The motorcycle of claim 2, wherein said induction system comprises a carburetor body and said intake passage connects said carburetor body to said cylinder head.

4. The motorcycle of claim 3, wherein said motorcycle comprises an engine suspension portion that is positioned rearward of said carburetor body.

5. The motorcycle of claim 4, wherein at least a portion of said carburetor body is positioned within a recess defined between said cylinder head and said crankcase.

6. The motorcycle of claim 5, wherein said at least a portion of said carburetor body comprises a lowermost portion and said lowermost portion is positioned along said cylinder body.

7. The motorcycle of claim 5, wherein an imaginary plane extends from a top surface of said crankcase to a top surface of said cylinder head and said at least a portion of said carburetor body is positioned below said imaginary plane.

8. The motorcycle of claim 1, wherein said central axis of said cylinder bore is generally horizontal.

9. The motorcycle of claim 8, wherein said cylinder head defines a chamber and one camshaft is positioned within said chamber, said camshaft defining a transverse rotational axis, said transverse rotational axis not extending through a forwardly extending imaginary extension of said central axis of said cylinder bore.

10. The motorcycle of claim 9, wherein said one camshaft actuates at least one intake valve and at least one exhaust valve.

11. The motorcycle of claim 9, wherein said transverse rotational axis of said cam shaft is positioned vertically lower than said forwardly extending imaginary extension of said central axis of said cylinder bore.

12. The motorcycle of claim 1, wherein said cylinder head comprises an intake mounting surface and said intake passage comprises a mounting face, said intake mounting surface and said mounting face facing each other and extending generally perpendicular to an interface between said cylinder head and said cylinder body.

13. The motorcycle of claim 12, wherein said cylinder head defines a camshaft chamber, a camshaft is positioned within said camshaft chamber, a drive member is secured to said camshaft, said drive member is connected to said crankshaft, said intake mounting surface being vertically higher than an upper wall of said cylinder head adjacent to said drive member.

14. The motorcycle of claim 1 further comprising a piston positioned within said cylinder bore, said piston connected to said crankshaft with a connecting rod, said cylinder bore comprising a recess that accommodates at least a portion of said connecting rod during movement of said piston.

15. The motorcycle of claim 14, wherein said cylinder bore is defined within a cylinder sleeve and said recess is formed in said cylinder sleeve.

16. The motorcycle of claim 14, wherein said recess and said rotational axis of said crankshaft are positioned to the same side of a generally transverse plane that extends along said central axis of said cylinder bore.

17. The motorcycle of claim 16, wherein said recess is intersected by a second plane that extends generally normal to said transverse plane and that extends through said central axis of said cylinder bore.

18. The motorcycle of claim 1, wherein said cylinder body comprises a cylinder bore with said central axis being defined in said cylinder bore, said crankcase being connected to said cylinder body, said cylinder body connected to said cylinder head, said cylinder head being positioned generally forward of said cylinder body, said cylinder body being positioned generally forward of said crankcase, said engine also comprising a valve train, said valve train comprising a single camshaft, said camshaft comprising a transverse rotational axis, said camshaft being operably connected to an intake valve and an exhaust valve such that rotation of said camshaft about said transverse rotational axis results in opening and closing of said intake valve and said exhaust valve, said cylinder body being offset relative to said crankshaft such that said rotational axis of said crankshaft and said central axis of said cylinder bore do not intersect and said cylinder body being offset relative to said camshaft such that said transverse rotational axis of said camshaft and said central axis of said cylinder bore do not intersect.

19. The motorcycle of claim 18, wherein a rearward extension of said central axis of said cylinder bore extends below said rotational axis of said crankshaft.

20. The motorcycle of claim 19, wherein a forward extension of said central axis of said cylinder bore extends above said transverse rotational axis of said camshaft.

21. The motorcycle of claim 18, wherein a forward extension of said central axis of said cylinder bore extends above said transverse rotational axis of said camshaft.

22. The motorcycle of claim 18, wherein rocker arms are positioned between said camshaft and said intake and exhaust valves.

23. The motorcycle of claim 1, wherein said cylinder head defining a cam chamber, a cam shaft being positioned within said cam chamber, said camshaft comprising a cam axis, a drive member being secured to said cam shaft, said cylinder body being connected to said cylinder head with said cylinder head being positioned generally forward of said cylinder body, said crankcase connected to said cylinder body, said cylinder body being positioned generally forward of said crankcase, said cylinder body defining a cylinder bore with said central axis being defined in said cylinder bore, an exhaust pipe being connected to a generally downwardly facing surface of said cylinder head, and an interface between said cylinder head and said exhaust pipe being generally vertically aligned with a lower wall of said cylinder head proximate said drive member.

24. The motorcycle of claim 23, wherein said central axis of said cylinder bore is generally horizontal, said camshaft is operably connected to an intake valve and an exhaust valve, and said camshaft is offset relative to said cylinder bore such that a forwardly extending imaginary extension of said central axis would extend vertically above said cam axis.

25. The motorcycle of claim 1 further comprising a footrest that is positioned forward of said engine, said cylinder head being closer to said footrest than said crankcase.

* * * * *